United States Patent
Kawamura

(10) Patent No.: US 10,439,405 B2
(45) Date of Patent: Oct. 8, 2019

(54) POWER STORAGE APPARATUS, TRANSPORT DEVICE, AND CONTROL METHOD

(71) Applicant: HONDA MOTOR CO., LTD., Tokyo (JP)

(72) Inventor: Masayuki Kawamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 15/403,176

(22) Filed: Jan. 11, 2017

(65) Prior Publication Data
US 2017/0207638 A1  Jul. 20, 2017

(30) Foreign Application Priority Data
Jan. 14, 2016 (JP) .................. 2016-005540

(51) Int. Cl.
*H02J 7/00* (2006.01)
*B60L 3/00* (2019.01)
(Continued)

(52) U.S. Cl.
CPC .......... *H02J 7/0021* (2013.01); *B60L 3/0038* (2013.01); *B60L 3/0092* (2013.01); *B60L 3/12* (2013.01);
(Continued)

(58) Field of Classification Search
CPC ... H02J 7/0021; H02J 7/0014; B60L 11/1868; B60L 11/1864; B60L 11/1861;
(Continued)

(56) References Cited

U.S. PATENT DOCUMENTS 5,446,645 A * 8/1995 Shirahama ............... H02J 3/46
307/58
5,614,804 A * 3/1997 Kayano ............... G01R 31/361
320/134
(Continued)

FOREIGN PATENT DOCUMENTS

CN 102628832 8/2012
CN 104024037 9/2014
(Continued)

OTHER PUBLICATIONS

Japanese Office Action for corresponding JP Application No. 2016-005540, dated Jun. 13, 2017.
(Continued)

*Primary Examiner* — Robert Grant
*Assistant Examiner* — John T Trischler
(74) *Attorney, Agent, or Firm* — Mori & Ward, LLP

(57) ABSTRACT

A power storage apparatus includes a first storage module, a second storage module, a charge-discharge circuit, and circuitry. The first storage module includes a first detector to detect first current input to and output from the first capacitor. The second storage module includes a second detector to detect second current input to and output from the second capacitor. The charge-discharge circuit is connected to the first capacitor and the second capacitor to charge and discharge the first capacitor and the second capacitor. The circuitry is configured to control the charge-discharge circuit to control charging and discharging between the first capacitor and the second capacitor. The circuitry is configured to determine whether or not at least one of the first detector and the second detector is to be corrected based on the first current and the second current during charging and discharging between the first capacitor and the second capacitor.

11 Claims, 10 Drawing Sheets

(51) Int. Cl.
*B60L 3/12* (2006.01)
*B60L 50/40* (2019.01)
*B60L 50/51* (2019.01)
*B60L 58/12* (2019.01)
*B60L 58/21* (2019.01)
*B60L 58/20* (2019.01)
*H02J 7/34* (2006.01)
*H02P 27/06* (2006.01)

(52) U.S. Cl.
CPC .............. *B60L 50/40* (2019.02); *B60L 50/51* (2019.02); *B60L 58/12* (2019.02); *B60L 58/20* (2019.02); *B60L 58/21* (2019.02); *H02J 7/0014* (2013.01); *H02J 7/0054* (2013.01); *B60L 2240/547* (2013.01); *B60L 2240/549* (2013.01); *B60L 2240/80* (2013.01); *B60L 2260/44* (2013.01); *H02J 7/345* (2013.01); *H02P 27/06* (2013.01); *Y02T 10/7005* (2013.01); *Y02T 10/7022* (2013.01); *Y02T 10/7044* (2013.01); *Y02T 10/7055* (2013.01); *Y02T 10/7061* (2013.01); *Y02T 10/7066* (2013.01)

(58) Field of Classification Search
CPC .... B60L 3/0092; B60L 3/0038; B60L 11/005; B60L 11/1803; B60L 3/12; G01R 19/00
USPC ........................................ 320/103, 104, 166
See application file for complete search history.

(56) References Cited

U.S. PATENT DOCUMENTS

| | | | | |
|---|---|---|---|---|
| 5,739,667 A * | 4/1998 | Matsuda | H02J 7/0072 | 320/128 |
| 5,936,381 A * | 8/1999 | Suh | H02J 7/0054 | 320/104 |
| 6,107,779 A * | 8/2000 | Hara | G01R 31/3613 | 320/132 |
| 6,204,636 B1 * | 3/2001 | Kinoshita | B60K 6/485 | 320/134 |
| 6,225,784 B1 * | 5/2001 | Kinoshita | B60K 6/485 | 320/130 |
| 6,271,645 B1 * | 8/2001 | Schneider | H02J 7/0014 | 320/118 |
| 6,313,606 B1 * | 11/2001 | Eguchi | G01R 31/361 | 320/132 |
| 6,329,772 B1 * | 12/2001 | Ochiai | B60K 6/48 | 318/139 |
| 6,422,331 B1 * | 7/2002 | Ochiai | B60K 6/48 | 180/65.25 |
| 6,427,100 B1 * | 7/2002 | Kaku | B60K 6/48 | 701/22 |
| 6,486,636 B1 * | 11/2002 | Stolitzka | G06F 1/263 | 320/128 |
| 6,573,682 B1 * | 6/2003 | Pearson | H01M 8/04007 | 320/101 |
| 6,583,626 B2 * | 6/2003 | Rosenberger | G01R 31/382 | 324/425 |
| 6,618,228 B1 * | 9/2003 | Hironaka | B62D 5/049 | 361/31 |
| 6,646,421 B2 * | 11/2003 | Kimura | G01R 31/361 | 320/132 |
| 6,664,795 B2 * | 12/2003 | Tamagawa | B60K 6/485 | 324/444 |
| 6,768,310 B2 * | 7/2004 | Yugo | G01R 19/0092 | 324/444 |
| 6,836,095 B2 * | 12/2004 | Fogg | G01R 31/3606 | 320/128 |
| 7,005,859 B2 * | 2/2006 | Knecht | G01R 19/0092 | 324/522 |
| 7,012,405 B2 * | 3/2006 | Nishida | H02J 7/0073 | 320/137 |
| 7,057,361 B2 * | 6/2006 | Kitahata | H02M 5/458 | 318/139 |
| 7,274,171 B2 * | 9/2007 | Nishida | H02J 7/0073 | 320/137 |
| 7,339,352 B2 * | 3/2008 | Iwashima | H02J 7/0021 | 320/132 |
| 7,568,537 B2 * | 8/2009 | King | B60K 6/48 | 180/65.1 |
| 7,705,556 B2 * | 4/2010 | Abe | B60R 16/0232 | 320/104 |
| 7,714,543 B2 * | 5/2010 | Yoshida | B60L 3/0038 | 320/134 |
| 7,750,602 B2 * | 7/2010 | Asada | H02J 7/163 | 320/128 |
| 7,821,234 B2 * | 10/2010 | Moriya | G01R 31/3624 | 320/134 |
| RE42,114 E * | 2/2011 | Matsuda | H02J 9/061 | 320/128 |
| 7,886,857 B2 * | 2/2011 | Fujitake | B60L 3/0046 | 180/2.1 |
| 7,888,944 B2 * | 2/2011 | Niroomand | G01R 15/146 | 320/132 |
| 7,893,652 B2 * | 2/2011 | Suzuki | B60L 11/1861 | 320/104 |
| 7,990,111 B2 * | 8/2011 | Mizuno | B60L 11/1861 | 320/139 |
| 8,005,632 B2 * | 8/2011 | Zettel | G01R 35/00 | 702/117 |
| 8,093,902 B2 * | 1/2012 | Nishi | G01R 31/3624 | 324/427 |
| 8,159,186 B2 * | 4/2012 | Iida | B66B 5/027 | 307/43 |
| 8,285,502 B2 * | 10/2012 | Kenly | G01R 19/0092 | 702/108 |
| 8,306,692 B2 * | 11/2012 | Ishishita | B60L 11/1861 | 180/54.1 |
| RE43,911 E * | 1/2013 | Matsuda | H02J 9/061 | 320/162 |
| 8,441,231 B2 * | 5/2013 | Menegoli | H02J 7/0052 | 320/128 |
| 8,509,975 B2 * | 8/2013 | Izumi | B60L 58/20 | 701/22 |
| 8,575,898 B2 * | 11/2013 | Kitano | H02J 7/0047 | 320/132 |
| 8,589,096 B2 * | 11/2013 | Kim | G01R 31/361 | 320/132 |
| 8,648,571 B2 * | 2/2014 | Oki | B60L 11/1809 | 320/104 |
| 8,751,055 B2 * | 6/2014 | Kake | H02J 3/38 | 700/293 |
| 8,754,613 B2 * | 6/2014 | Takahashi | H02J 7/0052 | 320/141 |
| 8,829,857 B2 * | 9/2014 | Minamiura | H01M 10/441 | 320/136 |
| 8,837,097 B2 * | 9/2014 | Zuercher | H02H 7/20 | 361/42 |
| 9,018,866 B2 * | 4/2015 | Ashida | H02P 31/00 | 318/139 |
| 9,041,358 B2 * | 5/2015 | Kato | H02J 7/0029 | 320/134 |
| 9,272,634 B2 * | 3/2016 | Li | B60L 1/003 | |
| 9,297,777 B2 * | 3/2016 | Sekimoto | A61B 5/14532 | |
| 9,325,170 B2 * | 4/2016 | Rozman | H02J 1/102 | |
| 9,356,445 B2 * | 5/2016 | Ge | B60L 11/1887 | |
| 9,487,090 B2 * | 11/2016 | Zhang | H02J 1/08 | |
| 9,539,912 B2 * | 1/2017 | Li | B60L 11/123 | |
| 9,566,875 B2 * | 2/2017 | Kawakita | H02J 7/044 | |
| 9,570,923 B2 * | 2/2017 | Nomura | H01M 10/425 | |
| 9,608,450 B2 * | 3/2017 | Cousineau | H02M 3/1584 | |
| 9,634,498 B2 * | 4/2017 | Kikuchi | B60L 11/1861 | |
| 9,945,886 B2 * | 4/2018 | Yugou | B60L 58/21 | |
| 2002/0097053 A1 * | 7/2002 | Tamagawa | B60K 6/485 | 324/382 |

(56) References Cited

U.S. PATENT DOCUMENTS

| | | | | |
|---|---|---|---|---|
| 2003/0146756 A1* | 8/2003 | Yugo | G01R 19/0092 | 324/444 |
| 2004/0090209 A1* | 5/2004 | Nishida | H02J 7/0073 | 320/149 |
| 2004/0145373 A1* | 7/2004 | Knecht | G01R 19/0092 | 324/522 |
| 2004/0196007 A1* | 10/2004 | Iwashima | H02J 7/0021 | 320/134 |
| 2004/0212347 A1* | 10/2004 | Fogg | G01R 31/3606 | 320/127 |
| 2005/0269991 A1* | 12/2005 | Mitsui | G01R 31/3624 | 320/132 |
| 2006/0087290 A1* | 4/2006 | Nishida | H02J 7/0073 | 320/128 |
| 2007/0158118 A1* | 7/2007 | King | B60K 6/48 | 180/65.1 |
| 2007/0222420 A1* | 9/2007 | Nishida | H02J 7/0073 | 320/162 |
| 2008/0036423 A1* | 2/2008 | Asada | H02J 7/163 | 320/134 |
| 2008/0048619 A1* | 2/2008 | Yoshida | B60L 3/0038 | 320/134 |
| 2008/0252265 A1* | 10/2008 | Kokubun | H02M 3/156 | 320/162 |
| 2008/0258711 A1* | 10/2008 | Niroomand | G01R 15/146 | 324/140 R |
| 2009/0128157 A1* | 5/2009 | Moriya | G01R 31/3624 | 324/426 |
| 2009/0134843 A1* | 5/2009 | Mizuno | B60L 11/1861 | 320/134 |
| 2009/0144002 A1* | 6/2009 | Zettel | G01R 35/00 | 702/64 |
| 2009/0254290 A1* | 10/2009 | Kim | G01R 31/361 | 702/63 |
| 2009/0301801 A1* | 12/2009 | Fujitake | B60L 3/0046 | 180/65.29 |
| 2010/0045239 A1* | 2/2010 | Oki | B60L 11/1809 | 320/132 |
| 2010/0070133 A1* | 3/2010 | Ishishita | B60L 11/1861 | 701/36 |
| 2010/0085057 A1* | 4/2010 | Nishi | G01R 31/3624 | 324/427 |
| 2010/0194352 A1* | 8/2010 | Kitano | H02J 7/0031 | 320/162 |
| 2010/0318252 A1* | 12/2010 | Izumi | B60L 58/20 | 701/22 |
| 2011/0018500 A1* | 1/2011 | Takahashi | H02J 7/0052 | 320/148 |
| 2011/0199053 A1* | 8/2011 | Minamiura | H01M 10/441 | 320/136 |
| 2011/0301772 A1* | 12/2011 | Zuercher | H02H 7/20 | 700/293 |
| 2012/0161709 A1* | 6/2012 | Fujii | H02J 7/0016 | 320/118 |
| 2012/0199496 A1* | 8/2012 | Sekimoto | A61B 5/14532 | 205/775 |
| 2012/0299553 A1* | 11/2012 | Menegoli | H02J 7/0052 | 320/140 |
| 2013/0013238 A1* | 1/2013 | Kawakita | H02J 7/044 | 702/63 |
| 2013/0049675 A1* | 2/2013 | Minami | H02J 7/0054 | 320/103 |
| 2013/0116889 A1* | 5/2013 | Zhang | B60L 1/12 | 701/36 |
| 2013/0229154 A1* | 9/2013 | Benjamin | G01R 31/3606 | 320/132 |
| 2013/0257379 A1* | 10/2013 | Kato | H02J 7/0029 | 320/128 |
| 2013/0320989 A1* | 12/2013 | Inoue | G01R 31/3624 | 324/427 |
| 2014/0009090 A1* | 1/2014 | Ashida | H02P 31/00 | 318/139 |
| 2014/0217821 A1* | 8/2014 | Rozman | B60L 1/00 | 307/29 |
| 2014/0306662 A1* | 10/2014 | Kim | H02J 7/0016 | 320/118 |
| 2015/0021998 A1* | 1/2015 | Trescases | H02J 3/385 | 307/46 |
| 2015/0035492 A1* | 2/2015 | Nomura | H01M 10/425 | 320/126 |
| 2015/0229144 A1* | 8/2015 | Jang | H02H 7/18 | 320/134 |
| 2015/0236530 A1* | 8/2015 | Kato | H02J 7/0029 | 320/107 |
| 2015/0295401 A1* | 10/2015 | Ge | B60L 11/1887 | 307/31 |
| 2015/0326021 A1* | 11/2015 | Cousineau | H02M 3/1584 | 307/52 |
| 2016/0072320 A1* | 3/2016 | Kanda | H02H 3/087 | 320/134 |
| 2016/0161439 A1* | 6/2016 | Sekimoto | A61B 5/14532 | 205/778 |
| 2016/0161440 A1* | 6/2016 | Sekimoto | A61B 5/14532 | 205/778 |
| 2016/0167540 A1* | 6/2016 | Tabatowski-Bush | B60L 11/1861 | 320/136 |
| 2017/0072803 A1* | 3/2017 | Murai | B60L 3/0046 | |
| 2017/0089955 A1* | 3/2017 | Yugou | B60L 58/21 | |
| 2017/0244338 A1* | 8/2017 | Kitamoto | B60L 11/1803 | |
| 2017/0282745 A1* | 10/2017 | Kawamura | H01M 16/00 | |
| 2017/0285109 A1* | 10/2017 | Kawamura | G01R 31/3606 | |
| 2017/0292990 A1* | 10/2017 | Kawamura | G01R 31/2829 | |
| 2017/0352926 A1* | 12/2017 | Kanomata | H01M 10/42 | |
| 2019/0081582 A1* | 3/2019 | Rozman | H02M 5/4585 | |

FOREIGN PATENT DOCUMENTS

| | | | | |
|---|---|---|---|---|
| JP | 2008-220080 | | 9/2008 | |
| JP | 2012176229 A | * | 9/2012 | A61B 5/14532 |
| JP | 2013-019832 | | 1/2013 | |

OTHER PUBLICATIONS

Chinese Office Action for corresponding CN Application No. 201710015372.5, dated Oct. 22, 2018.

* cited by examiner

POWER STORAGE APPARATUS, TRANSPORT DEVICE, AND CONTROL METHOD

CROSS-REFERENCE TO RELATED APPLICATIONS

The present application claims priority under 35 U.S.C. § 119 to Japanese Patent Application No. 2016-005540, filed Jan. 14, 2016. The contents of this application are incorporated herein by reference in their entirety.

BACKGROUND OF THE INVENTION

Field of the Invention

The present invention relates to a power storage apparatus, a transport device, and a control method.

Discussion of the Background

Japanese Patent Application Publication No. JP 2008-220080 discloses an electric vehicle that can estimate the state of charge (SOC) of a power storage apparatus for traveling vehicle. In the electric vehicle, when it is required to charge each power storage apparatus from an external power supply outside the vehicle, prior to charging the power storage apparatus, charging and discharging are performed between the power storage apparatuses. A battery ECU calculates voltage-current characteristics of each power storage apparatus based on the voltage and current of each power storage apparatus that is collected when charging and discharging. Further, OCV of each power storage apparatus is calculated on the basis of the calculated voltage-current characteristics, and the SOC of each power storage apparatus is estimated on the basis of the calculated OCV.

SUMMARY OF THE INVENTION

According to a first aspect of the present invention, a power storage apparatus includes a first storage module, a second storage module, a charge-discharge circuit, and a control unit. The first storage module has a first capacitor, and a first detection unit that detects input and output current of the first capacitor. The second storage module has a second capacitor, and a second detection unit that detects input and output current of the second capacitor. The charge-discharge circuit constitutes a current route between the first capacitor and the second capacitor. The control unit controls charging and discharging between the first capacitor and the second capacitor via the charge-discharge circuit. The control unit determines necessity of correction of the first detection unit and the second detection unit, based on a detection value of the first detection unit and a detection value of the second detection unit during charging and discharging between the first capacitor and the second capacitor.

According to a second aspect of the present invention, a controlling method performed by a power storage apparatus, the apparatus includes a first storage module which has a first capacitor, and a first detection unit that detects input and output current of the first capacitor, a second storage module which has a second capacitor, and a second detection unit that detects input and output current of the second capacitor, a charge-discharge circuit that constitutes a current route between the first capacitor and the second capacitor, and a control unit that controls charging and discharging between the first capacitor and the second capacitor via the charge-discharge circuit, wherein the control unit determines necessity of correction of the first detection unit and the second detection unit, based on a detection value of the first detection unit and a detection value of the second detection unit during charging and discharging between the first capacitor and the second capacitor via the charge-discharge circuit.

According to a third aspect of the present invention, a power storage apparatus includes a first storage module, a second storage module, a charge-discharge circuit, and circuitry. The first storage module includes a first capacitor and a first detector to detect first current input to and output from the first capacitor. The second storage module includes a second capacitor and a second detector to detect second current input to and output from the second capacitor. The charge-discharge circuit is connected to the first capacitor and the second capacitor to charge and discharge the first capacitor and the second capacitor. The circuitry is configured to control the charge-discharge circuit to control charging and discharging between the first capacitor and the second capacitor. The circuitry is configured to determine whether or not at least one of the first detector and the second detector is to be corrected based on the first current and the second current during charging and discharging between the first capacitor and the second capacitor.

According to a fourth aspect of the present invention, a control method includes controlling charging and discharging between a first capacitor and a second capacitor. It is determined whether or not at least one of a first detector and a second detector is to be corrected based on a first current and a second current during charging and discharging between the first capacitor and the second capacitor. The first detector is to detect the first current input to and output from the first capacitor. The second detector is to detect the second current input to and output from the second capacitor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
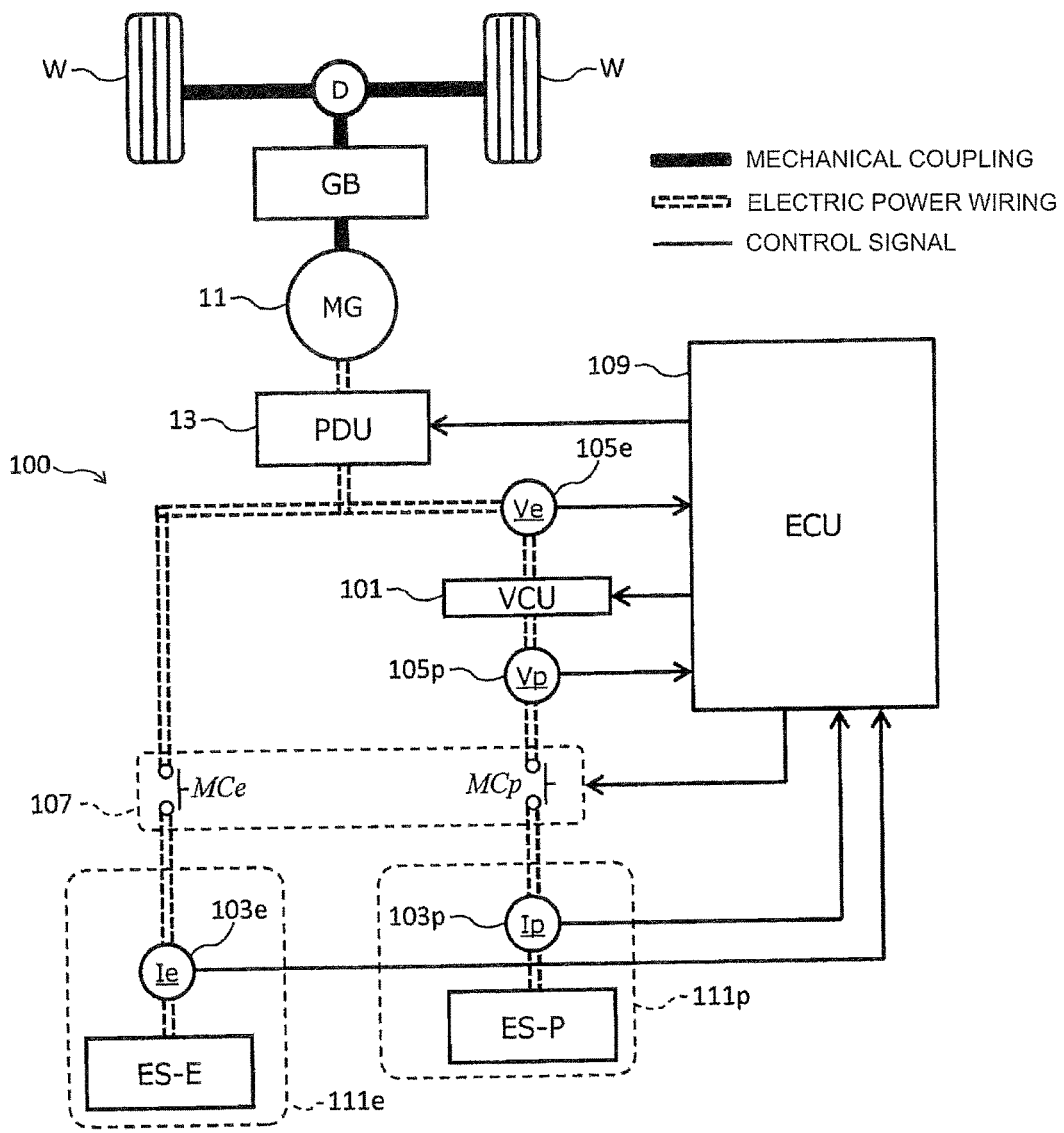
FIG. 1 is a block diagram illustrating a schematic configuration of an electric vehicle equipped with a power storage apparatus of an embodiment according to the present invention.

The embodiments will now be described with reference to the accompanying drawings, wherein like reference numerals designate corresponding or identical elements throughout the various drawings.

FIG. 1 is a block diagram illustrating a schematic configuration of an electric vehicle equipped with a power storage apparatus of an embodiment according to the present invention. A thick solid line in FIG. 1 illustrates a mechanical coupling, a double dotted line illustrates a power line, and a thin solid line illustrates a control signal. A 1MOT type electric vehicle illustrated in FIG. 1 includes a motor generator (MG) 11, a PDU (Power Drive Unit) 13, and a power storage apparatus 100 in an embodiment. Hereinafter, each component included in the electric vehicle will be described.

The motor generator 11 is driven by electric power supplied from the power storage apparatus 100, and generates power for allowing the electric vehicle to travel. Torque generated by the motor generator 11 is transmitted to drive wheels W via a gear box GB and a differential gear D, including a gear shift stage or a fixed stage. Further, the motor generator 11 operates as a generator at the time of deceleration of the electric vehicle to output the braking force of the electric vehicle. Further, the regenerative power generated by operating the motor generator 11 as a generator is stored in a battery of the power storage apparatus 100.

The PDU 13 converts the DC voltage into three-phase AC voltage and applies the three-phase AC voltage to the motor generator 11. Furthermore, the PDU 13 converts the AC voltage which is input at the regenerative operation of the motor generator 11 into a DC voltage.

As illustrated in FIG. 1, the power storage apparatus 100 is equipped with a high-capacity type battery ES-E, a high-output type battery ES-P, a voltage control unit (VCU) 101, current sensors 103e and 103p, voltage sensors 105p and 105e, a switch unit 107, and an electronic control unit (ECU) 109. Further, a single power storage module 111e is configured by the high-capacity type battery ES-E and the current sensor 103e, and a single power storage module 111p is constituted by the high-output type battery ES-P and the current sensor 103p.

The high-capacity type battery ES-E has a plurality of storage cells such as a lithium-ion battery or a nickel-hydrogen battery, and supplies high-voltage electric power to the motor generator 11. Also, the high-output type battery ES-P also has a plurality of storage cells such as a lithium-ion battery or a nickel-hydrogen battery and supplies high-voltage electric power to the motor generator 11 via the VCU 101. The high-output type battery ES-P is connected in parallel with the high-capacity type battery ES-E with respect to PDU 13 via the VCU 101. Further, in general, the voltage of the high-output type battery ES-P is lower than the voltage of the high-capacity type battery ES-E. Accordingly, the power of the high-output type battery ES-P is supplied to the motor generator 11 via the PDU 13, after being boosted to a voltage of the same level as the high-capacity type battery ES-E by the VCU 101.

Further, the high-capacity type battery ES-E or the high-output type battery ES-P is not necessarily limited to a secondary battery such as the nickel-hydride battery or the lithium-ion battery as described above. For example, although the storage capacity is small, a condenser or a capacitor capable of charging or discharging a large amount of power for a short time may be used as a high-output type battery ES-P.

Further, the characteristics of the high-capacity type battery ES-E are different from the characteristics of the high-output type battery ES-P. The high-capacity type battery ES-E is lower than the high-output type battery ES-P in the output weight density, but is higher than the high-output type battery ES-P in the energy weight density. Meanwhile, the high-output type battery ES-P is lower than the high-capacity type battery ES-E in the energy weight density, but is higher than the high-capacity type battery ES-E in the output weight density. In this way, the high-capacity type battery ES-E is relatively excellent in terms of the energy weight density, and the high-output type battery ES-P is relatively excellent in terms of the output weight density. Further, the energy weight density is an amount of electric power per unit weight (Wh/kg), and the output weight density is power per unit weight (W/kg). Therefore, the high-capacity type battery ES-E with the excellent energy weight density is a capacitor in which the high-capacity is the main purpose, and high-output type battery ES-P with the excellent output weight density is a capacitor in which the high-output is the main purpose.

Such differences between characteristics of the high-capacity type battery ES-E and the high-output type battery ES-P, for example, are caused by various parameters determined by the structure and the material of the components of the battery such as an electrode, active materials, and electrolyte/liquid. For example, the power storage capacity as a parameter indicating the total amount of chargeable and dischargeable electricity is excellent in the high-capacity type battery ES-E than the high-output type battery ES-P, and meanwhile, C-rate characteristics as a parameter indicating the deterioration resistance of the power storage capacity to charging and discharging or an internal resistance (impedance) as a parameter indicating the electric resistance value to charging and discharging is excellent in the high-output type battery ES-P than the high-capacity type battery ES-E.

The VCU 101 steps up the output voltage of the high-output type battery ES-P in the state of DC. Further, the VCU 101 steps down the power that is generated by the motor generator 11 during deceleration of the electric vehicle and is converted into DC. In addition, the VCU 101 steps down the output voltage of the high-capacity type battery ES-E in the state of DC. The power that is stepped down by the VCU 101 is charged to the high-output type battery ES-P. Further, the voltage level or the current level of DC power that is output by the VCU 101 is controlled by the ECU 117.

The current sensor 103p detects the input and output current Ip of the high-output type battery ES-P. Signal indicating the input and output current Ip detected by the current sensor 103p is sent to the ECU 117. The current sensor 103e detects the input and output current Ie of the high-capacity type battery ES-E. Signal indicating the input and output current Ie detected by the current sensor 103e is sent to the ECU 117.

The voltage sensor 105p detects the voltage Vp of the high-output type battery ES-P. Signal indicating the voltage Vp detected by the voltage sensor 105p is sent to the ECU 109. The voltage sensor 105e detects the voltage Ve of the high-capacity type battery ES-E. The voltage Ve detected by the voltage sensor 105e is equal to a value obtained by stepping up the voltage Vp of the high-output type battery ES-P through the VCU 101. Signal indicating the voltage Ve detected by the voltage sensor 105e is sent to the ECU 109.

The switch unit 107 has a contactor MCe that disconnects a current route from the high-capacity type battery ES-E to the PDU 13 or the VCU 101, and a contactor MCp that disconnects a current route from the high-output type battery ES-P to the VCU 101. Each of the contactors MCe and MCp is opened and closed under the control of the ECU 109.

Figure 2:
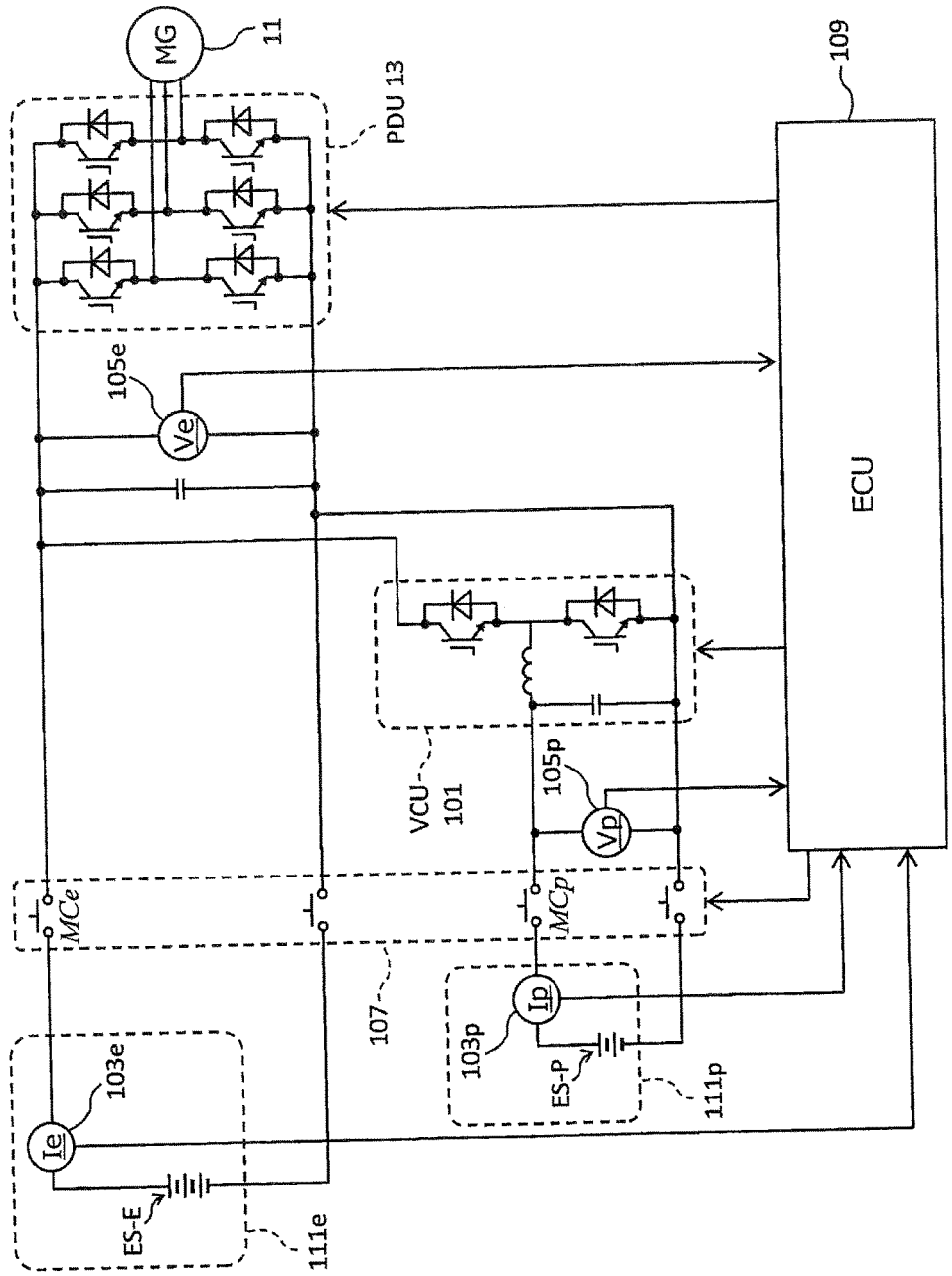
FIG. 2 is an electric circuit diagram illustrating a relation among a high-capacity type battery, a high-output type battery, a VCU, a PDU and a motor generator.

FIG. 2 is an electrical circuit diagram illustrating the relation among the high-capacity type battery ES-E, the high-output type battery ES-P, the VCU 101, the PDU 13 and the motor generator 11. As illustrated in FIG. 2, the VCU 101 steps up and outputs the voltage of the high-output type battery ES-P, by performing on-off switching operation of the two switching elements including the high-side and the low-side, using the output voltage of the high-output type battery ES-P as the input voltage. Furthermore, the PDU 13 converts the DC voltage into an AC voltage and outputs it to the motor generator 11, by performing on-off switching operation of six switching elements using the output voltage of the high-capacity type battery ES-E as the input voltage.

Figure 3:
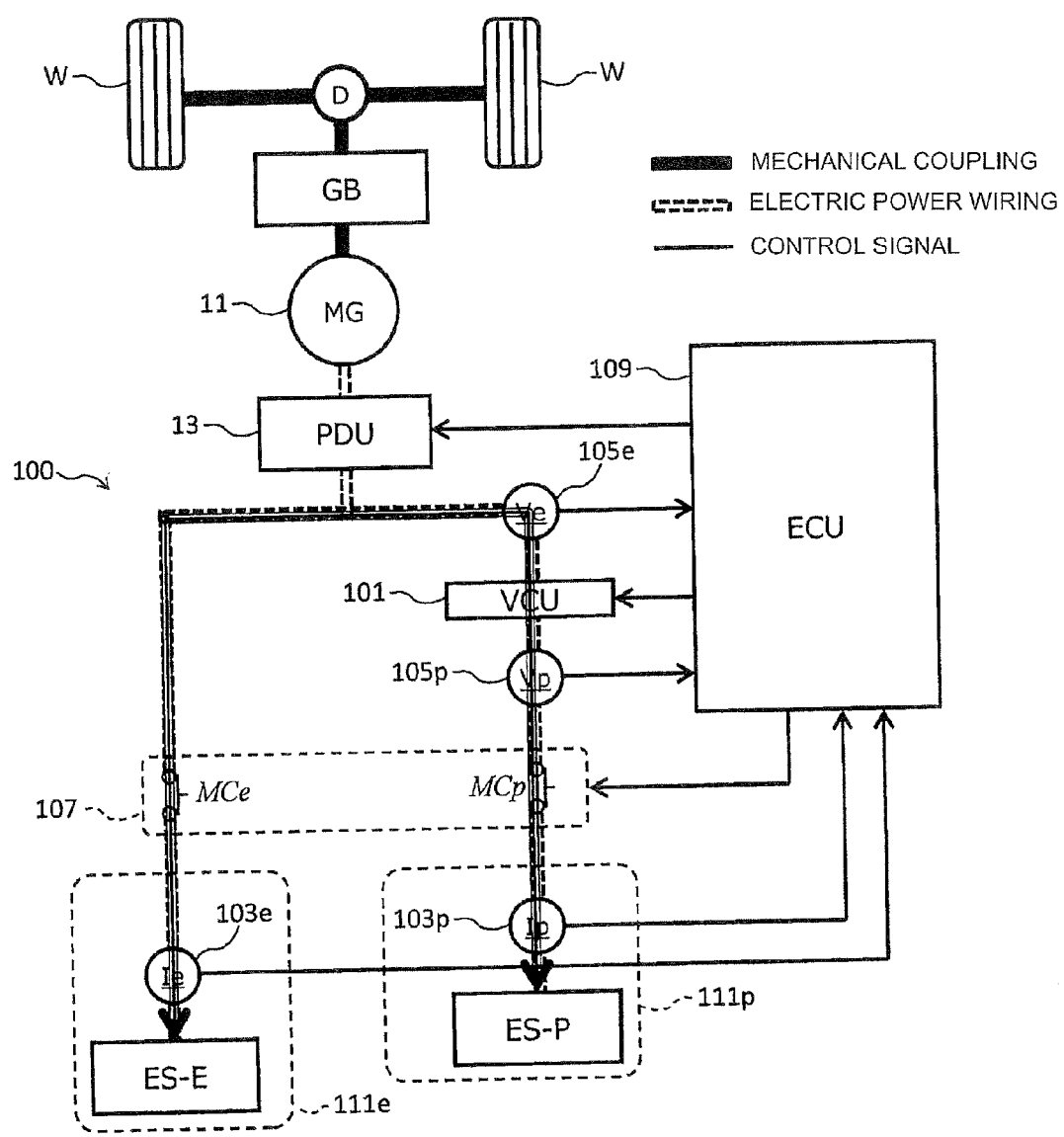
FIG. 3 is a diagram illustrating the flow of current when performing the charge and discharge between the high-capacity type battery and the high-output type battery via VCU.

The ECU 109 performs the off-control of the entire switching elements of the PDU 13, electrical-systematically opens the high-capacity type battery ES-E and the high-output type battery ES-P from the motor generator 11, and performs the switching-control of the VCU 101. Accordingly, as illustrated in FIG. 3, the high-capacity type battery ES-E and the high-output type battery ES-P enter a state capable of being chargeable or dischargeable each other via the VCU 101.

The ECU 109 performs the control of the PDU 13 and the VCU 101, as well as the opening and closing controls of the switch unit 107. In addition, the ECU 109 performs the power distribution control using the VCU 101 to take advantage of the respective characteristics of the high-capacity type battery ES-E and the high-output type battery ES-P having the characteristics different from each other. If such a power distribution control is performed, the high-capacity type battery ES-E is used to supply the constant electric power to the motor generator 11 during acceleration traveling of the electric vehicle, and the high-output type battery ES-P is used to supply the electric power to the motor generator 11 when a large driving force is required for traveling of the electric vehicle. Further, at the time of deceleration traveling of the electric vehicle, the ECU 109 charges at least one of the high-capacity type battery ES-E and the high-output type battery ES-P, by the regenerative power generated by the motor generator 11. At the time of stop of the electric vehicle in which the power distribution control is performed, it is possible to charge and discharge the high-capacity type battery ES-E and the high-output type battery ES-P via the aforementioned VCU 101.

Figure 4:
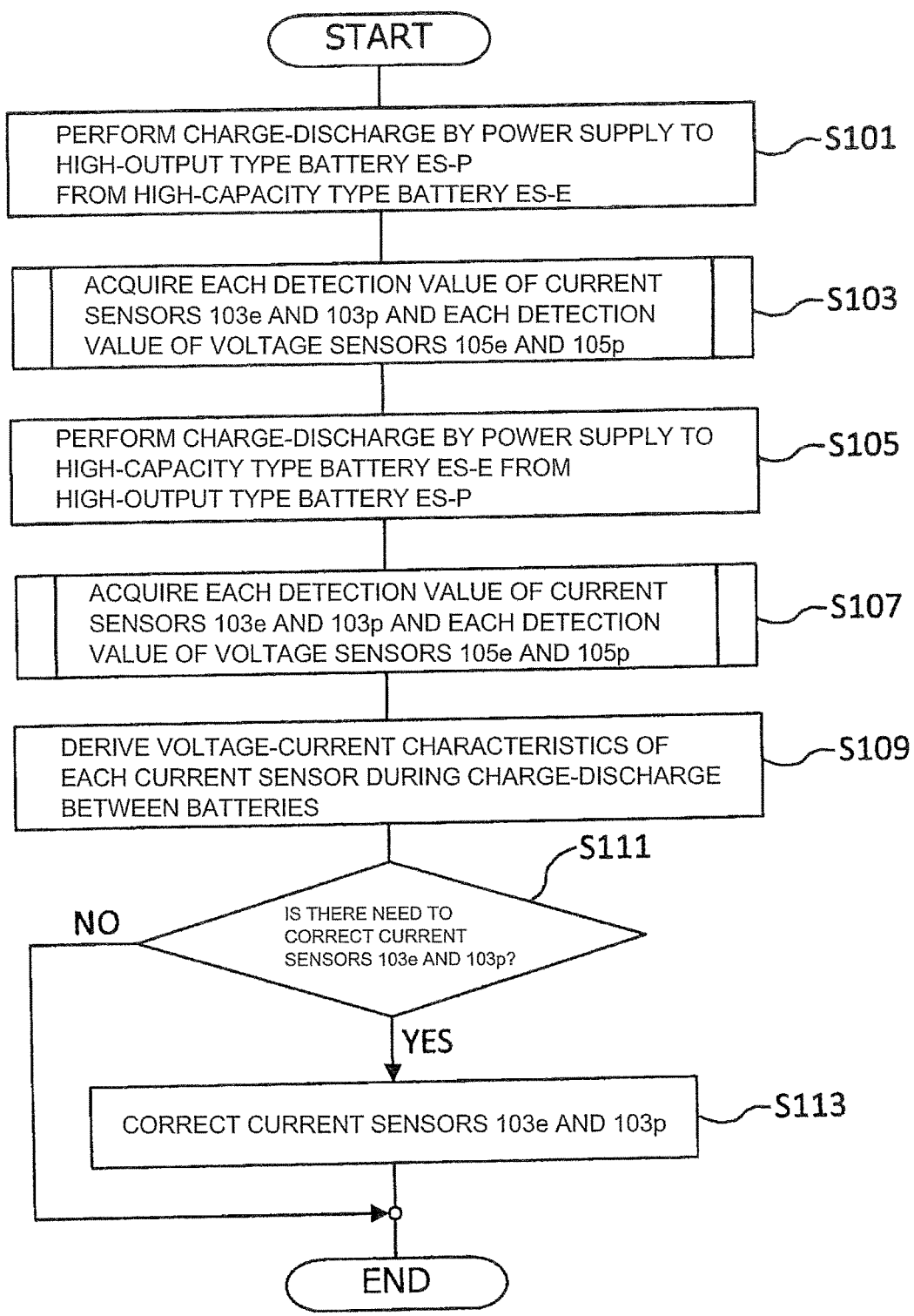
FIG. 4 is a flowchart illustrating a flow of a process when an ECU corrects a current sensor.
Figure 5:
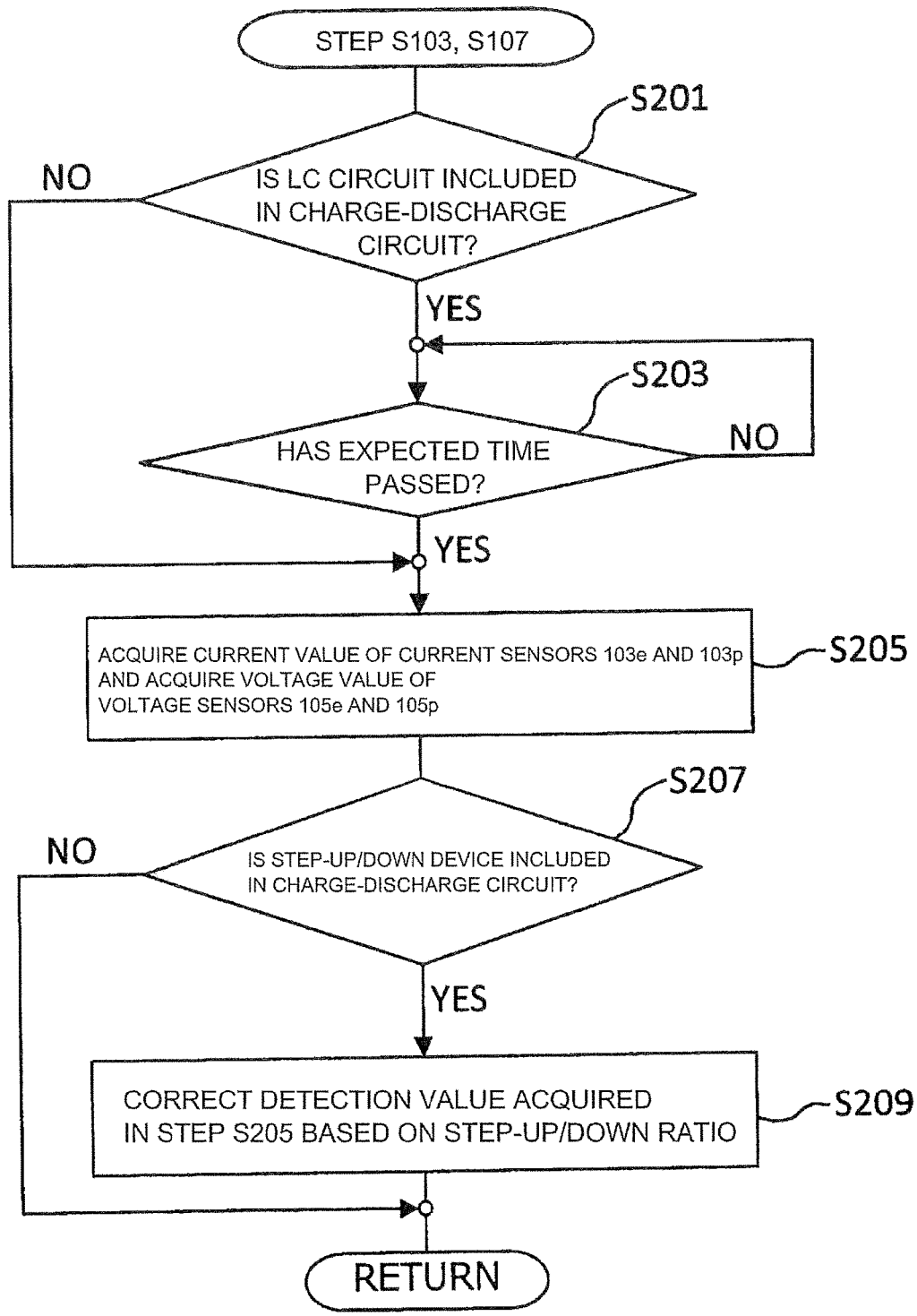
FIG. 5 is a flowchart illustrating a flow of a process of the subroutine performed in steps S103 and S107 illustrated in FIG. 4.

In addition, the ECU 109 determines the necessity of correction of the current sensors 103e and 103p, based on each input and output current detected by the current sensors 103e and 103p at the time of charging and discharging between the high-capacity type battery ES-E and the high-output type battery ES-P via the aforementioned VCU 101, and each voltage detected by the voltage sensors 105e and 105p. When the correction is required, the ECU 109 corrects the detection values of the current sensors 103e and 103p. Hereinafter, the process of correcting the current sensors 103e and 103p using the ECU 109 will be described in detail with reference to FIGS. 4 and 5. FIG. 4 is a flowchart illustrating a flow of process when the ECU 109 corrects the current sensors 103e and 103p. FIG. 5 is a flowchart illustrating a flow of process of the subroutine performed in steps S103 and S107 illustrated in FIG. 4.

As illustrated in FIG. 4, the ECU 109 performs the turn-off control of the entire switching elements of the PDU 13, and controls the VCU 101 to perform charging and discharging by the electric power supply from the high-capacity type battery ES-E to the high-output type battery ES-P (step S101). Next, the ECU 109 obtains the respective detection values of the current sensors 103e and 103p, and the respective detection values of the voltage sensors 105e and 105p (step S103). Next, the ECU 109 controls the VCU 101 to perform charging and discharging by the electric power supply from the high-output type battery ES-P to the high-capacity type battery ES-E, that is, so that the charge and discharge current flows in the reverse direction of step S101, while performing off-control of the entire switching elements of the PDU 13 (step S105). Next, the ECU 109 obtains the respective detection values of the current sensors 103e and 103p and the respective detection values of the voltage sensors 105e and 105p when the charge and discharge current flows in the reverse direction of the step S101 (step S107).

Further, in the subroutine performed in steps S103 and S107 illustrated in FIG. 4, as illustrated in FIG. 5, the ECU 109 determines whether an LC circuit is included within the charge-discharge circuit that forms the current route between the high-capacity type battery ES-E and the high-output type battery ES-P (step S201), when the LC circuit is included, the process proceeds to step S203, and when the LC circuit is not included, the process proceeds to step S205. In the present embodiment, as illustrated in FIGS. 1 and 2, since the VCU 101 is included in the charge-discharge circuit, it is determined to include the LC circuit. The ECU 109 obtains the respective detection values of the current sensors 103e and 103p, and the respective detection values of the voltage sensors 105e and 105p, after waiting the elapse of a predetermined time from the start of charging and discharging between the batteries in step S203 (step S205). The predetermined time at which the ECU 109 waits in step S203 is determined based on the inductive component (inductor) of the LC circuit included within the charge-discharge circuit. The predetermined time is set to be longer, as the inductance of the LC circuit increases.

Hereinafter, when the LC circuit is included within the charge-discharge circuit (YES in step S201), upon acquiring the respective detection values of the current sensors 103e and 103p and the respective detection values of the voltage sensors 105e and 105p in step S205, the reason for performing step S203, that is, the reason for waiting the elapse of a predetermined time from the start of the charge and discharge between the batteries will be described in detail.

Figure 6:
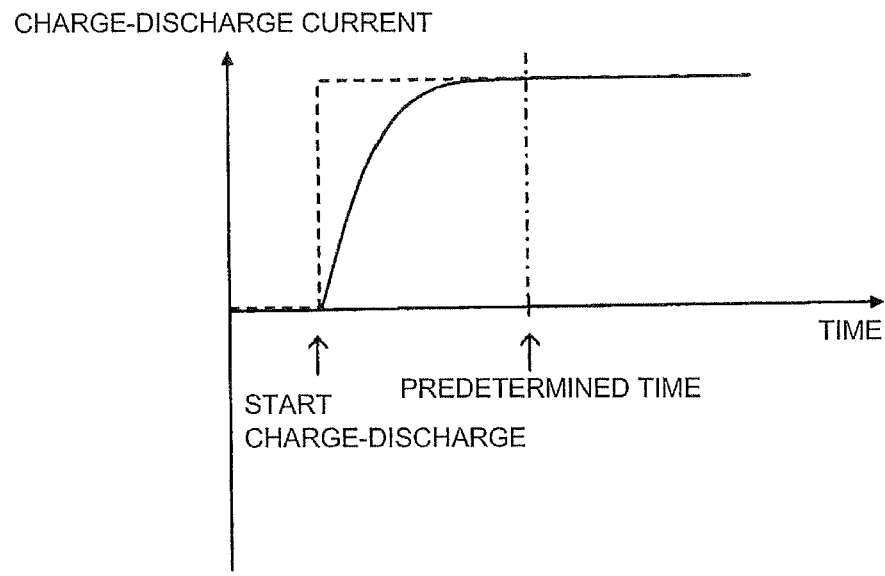
FIG. 6 is a diagram illustrating a relation between the charge and discharge current and a predetermined time after the start of charging and discharging.

As described above, when stepping-up is accompanied between two points in the electrical circuit, the detection value of the current sensor provided between the two points is known to have a correlation based on the step-up/down ratio. Although the present invention corrects the current sensor provided between the two points using the correlation, since a LC circuit is included in the DC-DC converter or the like for performing the stepping-up, due to the influence of the induced current, the relation between the charge-discharge current and the predetermined time after the start of charging and discharging is generally as illustrated in FIG. 6. Therefore, when the detection value (charge-discharge current value) of the current sensor after the lapse of a predetermined time is saturated, the necessity determination of the current sensor correction and the correction cannot be exactly performed. Since the time required until the detection value of the current sensor is saturated depends on the time constant τ determined from the inductance value and the capacitance value of the LC circuit, the inductance value and the capacitance value of the LC circuit, by setting the predetermined period of time based on the inductance value and the capacitance value of the LC circuit and the time constant, the necessity determination of the current sensor correction and the correction are properly performed.

After performing the step S205, the ECU 109 determines whether include step-up/down device in the charge-discharge circuit (step S207), if the step-up/down device is included, the process proceeds to step S209, and if the step-up/down device is not included, the process returns to the main routine of FIG. 4. In step S209, after the ECU 109 corrects the detection value acquired in step S205 based on the step-up/down ratio, the process returns to the main routine of FIG. 4. In the present embodiment, as illustrated in FIGS. 1 and 2, since the VCU 101 is included in charge-discharge circuit, at the time of charging and discharging from the high-capacity type battery ES-E to the high-output type battery ES-P, the ECU 109 multiplies the detection value of the current sensor 103p by the step-up/down ratio. Further, at the time of charging and discharging from the high-output type battery ES-P to the high-capacity type battery ES-E, the ECU 109 multiplies the detection value of current sensor 103p by an inverse of the step-up/down ratio.

Figure 7:
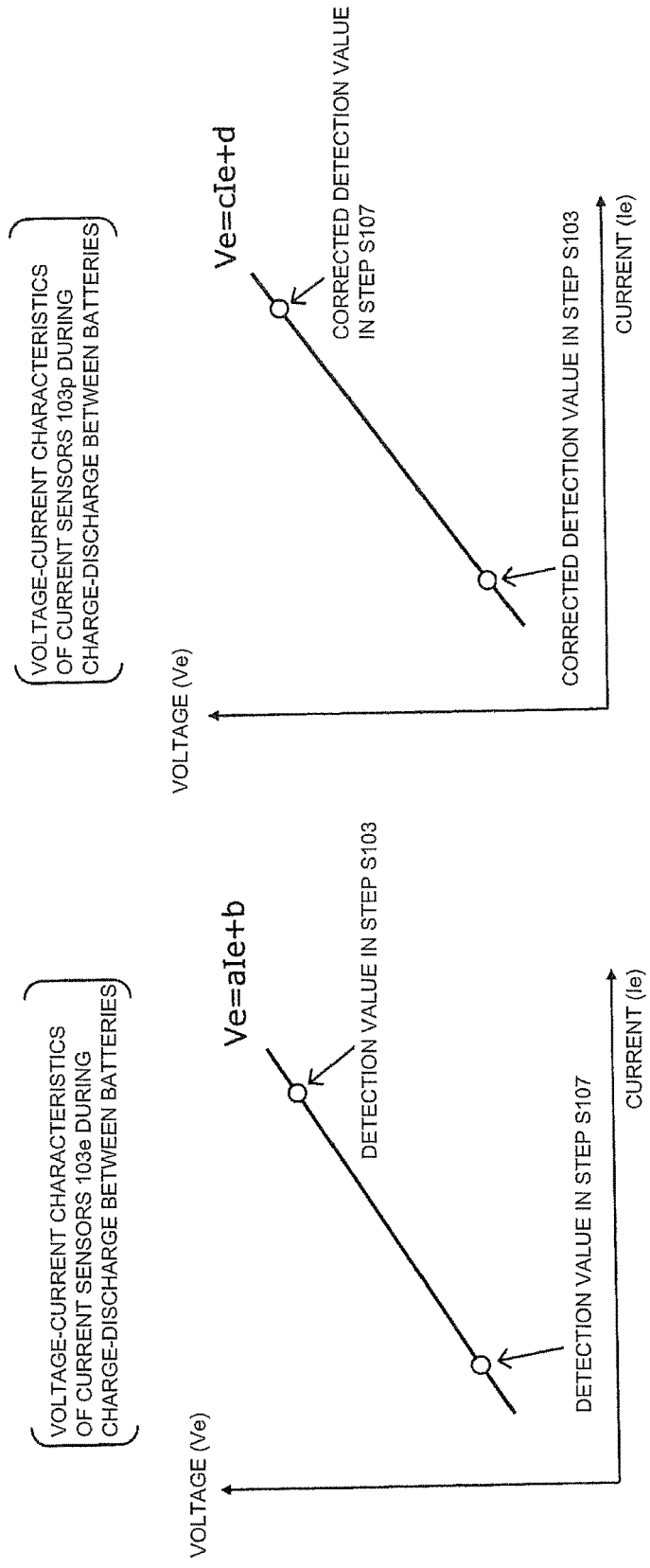
FIG. 7 is a diagram illustrating voltage-current characteristics of each current sensor at the time of charging between the batteries.

Next, the ECU 109 derives the voltage-current characteristics of each current sensor at the time of charging and discharging between the batteries illustrated in FIG. 7, using each detection value obtained in step S103 and step S107 and corrected in some cases (step S109). In the example illustrated in FIG. 7, the voltage-current characteristics of the current sensor 103e is expressed as "Ve=aIe+b", and the voltage-current characteristics of the current sensor 103p is expressed as "Ve=cIe+d".

Next, the ECU 109 determines whether to correct the current sensors 103e and 103p, by determining whether an absolute value (|(a+c)/2−a|) of the difference between an average value (a+c)/2 of the slope of the two straight lines indicative of the voltage-current characteristics derived in step S109 and a single slope a exceeds a threshold th1 (step S111). In step S111, if "|(a+c)/2−a|>th1" the ECU 109 determines to perform the correction of the current sensors 103e and 103p, and the process proceeds to step S113, and if "|(a+c)/2−a|≤th1", the ECU 109 determined not to perform the correction and terminates the series of processes.

Figure 10:
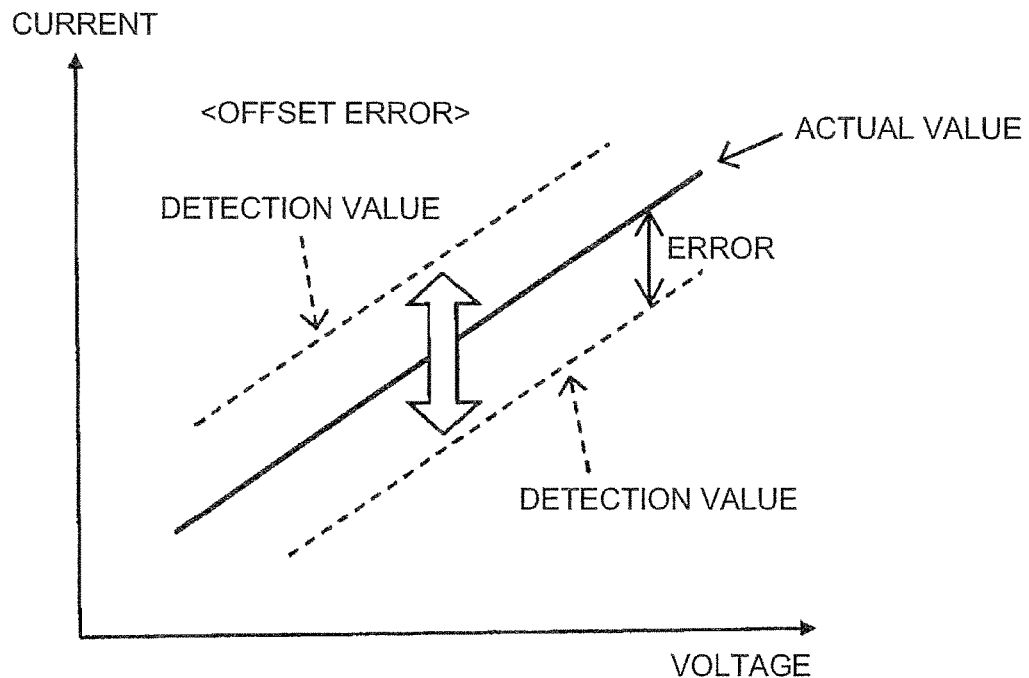
FIG. 10 is a diagram illustrating an offset error and a gain error of the current sensor.
Figure 10:
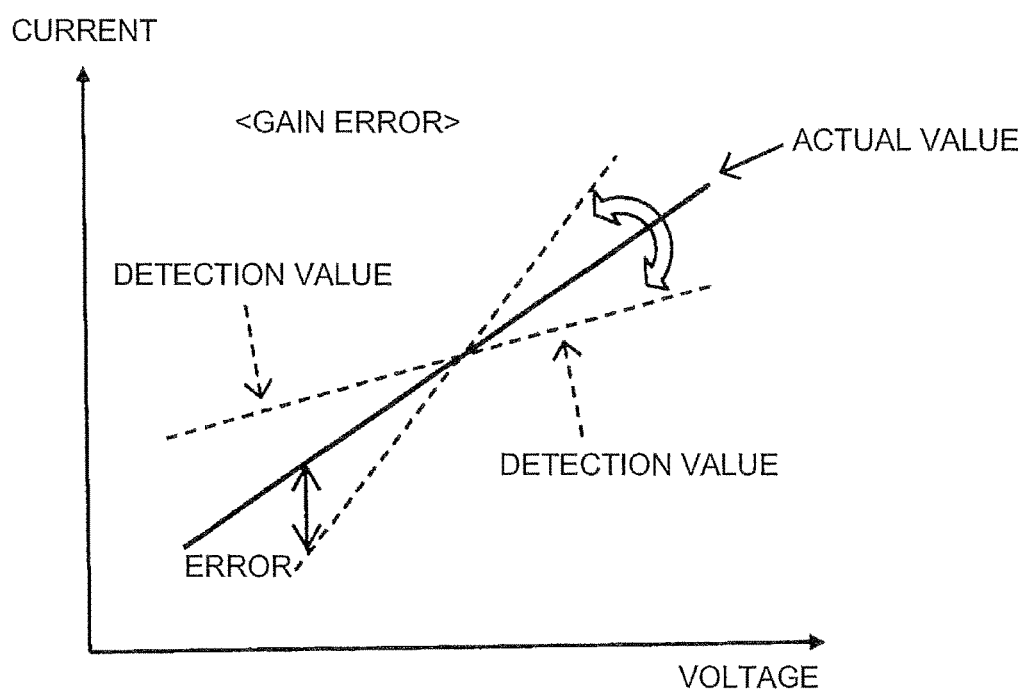

In step S113, the ECU 109 corrects the gain error illustrated in FIG. 10 included in the detection value of the current sensors 103e and 103p, by correcting the current sensors 103e and 103p such that the slopes a and c of the two straight lines indicative of the voltage-current characteristics of the high-capacity type battery ES-E during charging and discharging of the battery become the average value (a+c)/2 of the two slopes. Further, the ECU 109 corrects the offset error illustrated in FIG. 10 included in the detection values of the current sensors 103e and 103p, by correcting the current sensors 103e and 103p such that sections b and d of the two straight lines become the average value (b+d)/2 of the two sections.

Since the gain error and the offset error included in each of the current sensors 103e and 103p can be equalize by performing the correction in step S113, it is possible to reduce an expected value of errors included in the entire current sensors 103e and 103p. Further, when the step-up/down is not accompanied in the battery charge and discharge, the current values detected by the current sensors 103e and 103p becomes substantially the same, and meanwhile, when the step-up/down is accompanied, the current values detected by the current sensors 103e and 103p have a correlation based on the step-up/down ratio. Therefore, it is possible to improve the accuracy of the control using the current values detected by the current sensors 103e and 103p.

Further, in step S111, although it is determined whether to correct the current sensors 103e and 103p on the basis of the slopes of the two straight lines indicative of the voltage-current characteristics derived in step S109, the necessity of the correction may be determined on the basis of the sections of the two straight lines. In this case, the ECU 109 determines whether to correct the current sensors 103e and 103p by discriminating the absolute value (|(b+d)/2−b|) of the difference between the average value (b+d)/2 of the sections of two straight lines indicative of the voltage-current characteristics and one slope b exceeds the threshold th2, if "|(b+d)/2−b|>th2", the ECU 109 determines to perform the correction, and if "|(b+d)/2−b≤th2|", the ECU 109 determines not to perform the correction.

As described above, according to this embodiment, it is possible to accurately determine the necessity of correction for the errors included in the overall current sensors 103e and 103p provided in the same electric circuit, on the basis of a difference in components indicative of the voltage-current characteristics of each current sensor based on the detection values of the current sensors 103e and 103p and the detection values of the voltage sensors 105e and 105p, when charging and discharging the high-capacity type battery ES-E and the high-output type battery ES-P that are not influenced by the state of the load. Further, when the step-up/down is not accompanied in the battery charge-discharge, the current values detected by the current sensors 103e and 103p becomes substantially the same, and meanwhile, when the step-up/down is accompanied, the current values detected by the current sensors 103e and 103p have a correlation based on the step-up/down ratio. Further, the detection values at the time of charging and discharging from the high-capacity type battery ES-E to the high-output type battery ES-P, as well as the detection values of the time of charging and discharging from the high-output type battery ES-P to the high-capacity type battery ES-E are used. Accordingly, when it is determined that there is a need to correct the current sensors 103e and 103p, it is possible to sufficiently reduce the expected value of the errors included in the entire current sensors 103e and 103p, by equalizing the offset error and the gain error included in the detection values by performing the correction.

Further, if the circuit including the inductive components is included in the charge-discharge circuit between the high-capacity type battery ES-E and the high-output type battery ES-P, as the detection value of the current sensors 103e and 103p and the detection values of the voltage sensors 105e and 105p, the values detected after the effect of inductive components is settled after the elapse of a predetermined time from the start of charge and discharge are used. Accordingly, it is possible to improve the accuracy of the necessity determination of correction for the errors included in the entire current sensors 103e and 103p. Moreover, even if the VCU 101 is included in the charge-discharge circuit, since the detection values are corrected on the basis of the step-up/down ratio of the VCU 101, it is possible to accurately perform the necessity determination of correction for the errors included in the overall current sensors 103*e* and 103*p* based on the comparison of the slope of the two straight lines with the sections indicative of the voltage-current characteristics.

Further, the present invention is not limited to the aforementioned embodiments, and suitable modifications, improvements and the like can be made. For example, although the aforementioned electric vehicle is a 1MOT type electrical vehicle (EV), the electric vehicle may be an EV equipped with a plurality of motor generators, a hybrid electrical vehicle (HEV) equipped with an internal combustion engine with at least one motor generator, or a plug-in hybrid electrical vehicle (PHEV).

Figure 8:
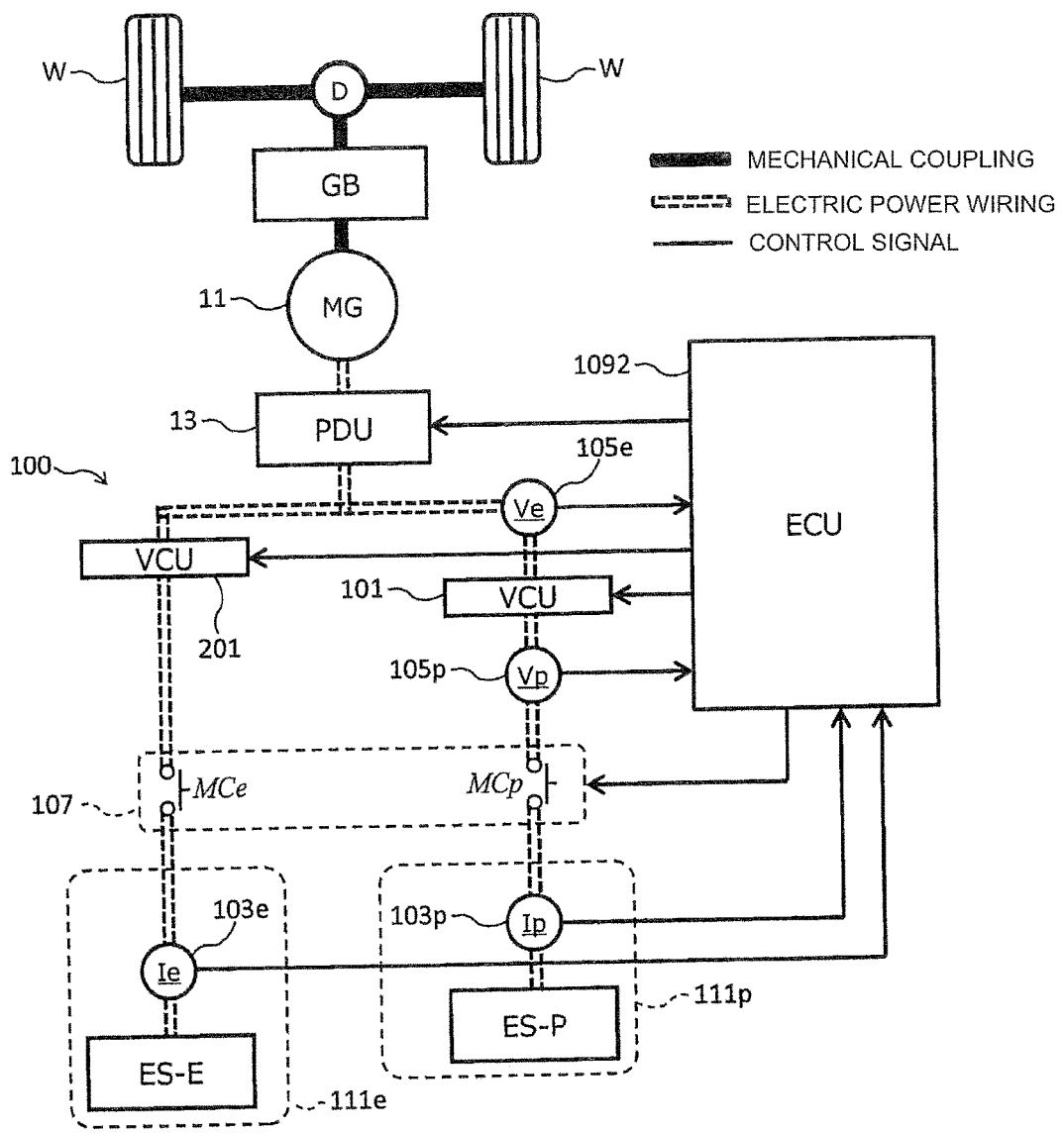
FIG. 8 is a block diagram illustrating a schematic configuration of an electric vehicle equipped with a power storage apparatus in another embodiment.
Figure 9:
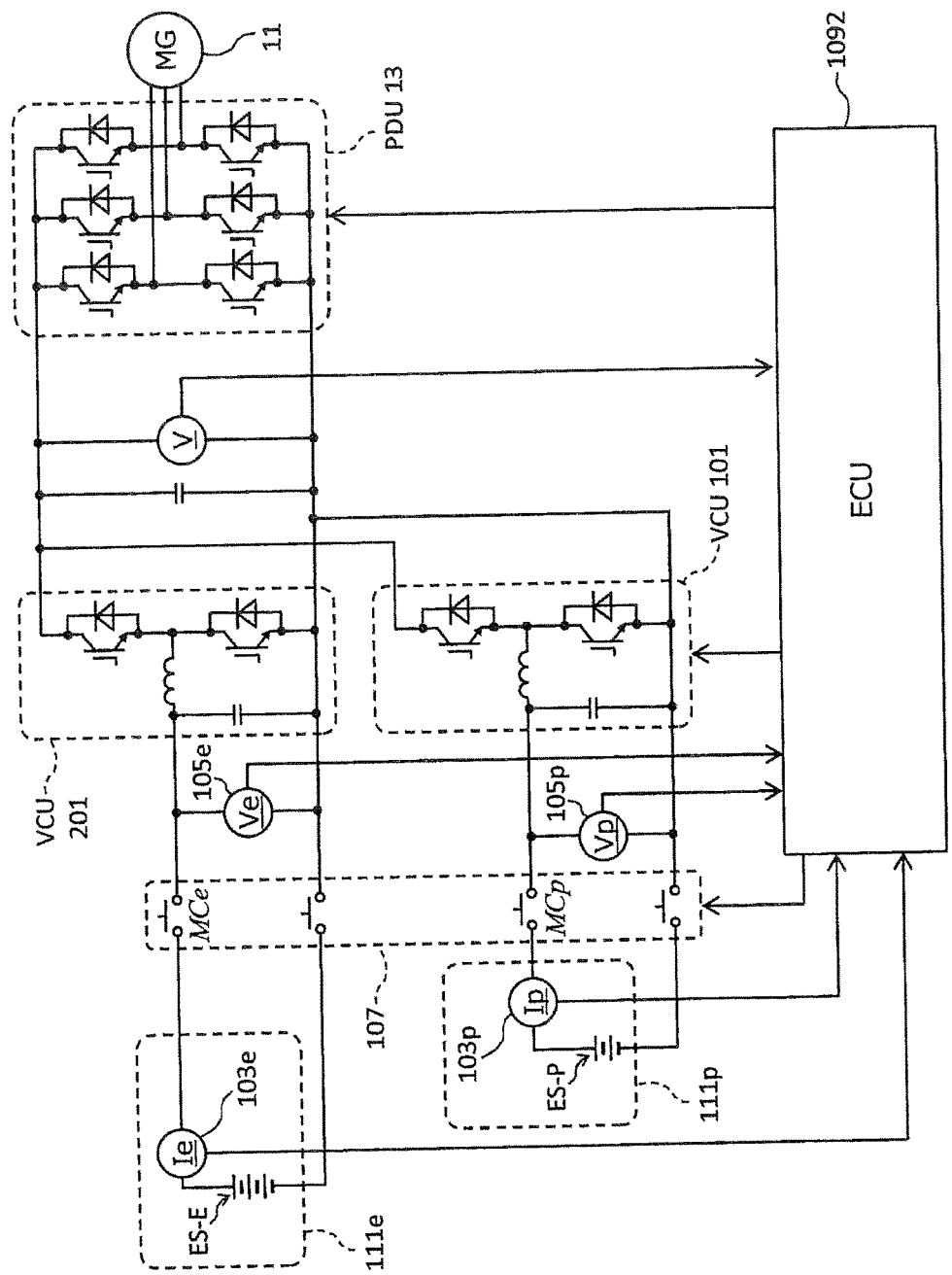
FIG. 9 is an electric circuit diagram illustrating a relation among a high-capacity type battery, a high-output type battery, a VCU, a PDU and a motor generator in another embodiment.

Although the VCU 101 of the present embodiment steps up the voltage Vp of the high-output type battery ES-P, if the voltage Ve of the high-capacity type battery ES-E is lower than the voltage Vp of the high-output type battery ES-P, a VCU which steps down the voltage Vp of the high-output type battery ES-P is used. Further, it is also possible to use a VCU capable of bidirectionally stepping up and down. In addition, as illustrated in FIG. 8, the VCU 201 may also be provided on the high-capacity type battery ES-E side. By providing the two VCUs, since the voltage applied to the motor generator 11 and the PDU 13 is not bound to the high-capacity type battery ES-E, the efficiency is improved. Further, even in the case of the configuration having the two VCUs 101 and 201 as illustrated in FIG. 8, the constant current control can be performed by only one VCU.

Further, in the flowchart illustrated in FIG. 4, discharging from the high-capacity type battery ES-E to the high-output type battery ES-P is first performed (step S101), and thereafter discharging from the high-output type battery ES-P to the high-capacity type battery ES-E is performed (step S105). However, by reversing this order, discharging from the high-output type battery ES-P to the high-capacity type battery ES-E is first performed, and thereafter, discharging from the high-capacity type battery ES-E to the high-output type battery ES-P may be performed. In particular, since the degree of deterioration influence of the high-output type battery ES-P to the capacity retention rate increases in accordance with its own SOC, by discharging the high-output type battery ES-P first, when the degree of deterioration of influence of the high-output type battery ES-P becomes larger than the threshold value, it is preferable to first charge the high-output type battery ES-P. Similarly, by charging the high-output type battery ES-P first, when a degree of deterioration influence of the high-output type battery ES-P becomes larger than the threshold, it is preferable to first discharge the high-output type battery ES-P.

There is provided a power storage apparatus that includes: a first storage module (for example, a power storage module 111*e* in the embodiment described later) which has a first capacitor (for example, high-capacity type battery ES-E in the embodiment described later), and a first detection unit (for example, a current sensor 103*e* in the embodiment described later) that detects input and output current of the first capacitor; a second storage module (for example, a power storage module 111*p* in the embodiment described later) which has a second capacitor (for example, a high-output type battery ES-P in the embodiment described below), and a second detection unit (for example, a current sensor 103*p* in the embodiment described later) that detects input and output current of the second capacitor; a charge-discharge circuit (for example, VCU 101 in the embodiment described below) that constitutes a current route between the first capacitor and the second capacitor; and a control unit (for example, an ECU 109 in embodiment described later) that controls charging and discharging between the first capacitor and the second capacitor via the charge-discharge circuit, wherein the control unit determines necessity of correction of the first detection unit and the second detection unit, based on a detection value detected by the first detection unit and a detection value detected by the second detection unit during charging and discharging between the first capacitor and the second capacitor.

The charging and discharging between the first capacitor and the second capacitor include charging and discharging in which current flows from the first capacitor to the second capacitor, and charging and discharging in which current flows from the second capacitor to the first capacitor.

The charge-discharge circuit includes an inductor, and the control unit determines the necessity of the correction of the first detection unit and the second detection unit, based on the detection value of the first detection unit and the detection value of the second detection unit after elapse of a predetermined time from the start of charging and discharging between the first capacitor and the second capacitor.

The predetermined time is based on the inductance of the inductor.

The charge-discharge circuit includes a converter unit that converts at least one of an output voltage of the first capacitor and an output voltage of the second capacitor (for example, VCU 101 in the embodiment described later), and the control unit corrects at least one of the detection value of the first detection unit and the detection value of the second detection unit, based on a predetermined coefficient in the convertor.

The predetermined coefficient is a voltage conversion ratio of the converter.

The control unit corrects at least one of the first detection unit and the second detection unit, when it is determined that there is a need to correct the first detection unit and the second detection unit.

The control unit corrects both of the first detection unit and the second detection unit, when it is determined that there is a need to correct the first detection unit and the second detection unit.

The second capacitor is superior to the first capacitor in an output weight density, and is inferior in an energy weight density.

There is provided a transport device including the power storage apparatus.

There is provided a controlling method performed by a power storage apparatus, the apparatus including: a first storage module (for example, a power storage module 111*e* in the embodiment described later) which has a first capacitor (for example, high-capacity type battery ES-E in the embodiment described later), and a first detection unit (for example, a current sensor 103*e* in the embodiment described later) that detects input and output current of the first capacitor; a second storage module (for example, a power storage module 111*p* in the embodiment described later) which has a second capacitor (for example, a high-output type battery ES-P in the embodiment described below), and a second detection unit (for example, a current sensor 103*p* in the embodiment described later) that detects input and output current of the second capacitor; a charge-discharge circuit (for example, a VCU 101 in the embodiment described below) that constitutes a current route between the first capacitor and the second capacitor; and a control unit (for example, an ECU 109 in the embodiment described later) that controls charging and discharging between the first capacitor and the second capacitor via the charge-discharge circuit, wherein the control unit determines necessity of correction of the first detection unit and the second detection unit, based on a detection value detected by the first detection unit and a detection value detected by the second detection unit during charging and discharging between the first capacitor and the second capacitor.

When performing charging and discharging between any two points in the same electric circuit, if stepping-up is not accompanied in the charging and discharging between the two points, the current values detected by the two points are known to be approximately the same. Further, even when stepping-up is accompanied, the current values detected at two points are also known to have a correlation based on the step-up/down ratio. By averaging the values detected by each of the current sensors provided at the two points using this principle, it is possible to equalize the errors of the current sensor, thereby reducing an expected value of the errors included in the entire current sensors. However, for this purpose, it is necessary to supply a plurality of currents with values different from each other between the two points. Further, the expected value of the error is a value obtained by averaging the degree of errors generated in the current sensor, by the weight of the occurrence probability of each error.

However, in the power storage apparatus having only the existing single power source, since the current value flowing between the two points is bound to the state of the load (for example, the motor generator) for performing the exchange of the electric power with the power source, it is difficult to reduce the errors of the current sensor.

Accordingly, according to the embodiment, it is possible to accurately determine the necessity of correction for the errors included in both of the first detection unit and the second detection unit provided in the same electric circuit, on the basis of the input and output current of the first capacitor detected by the first detection unit, and the input and output current of the second capacitor detected by the second detection unit, at the time of charging and discharging between the first capacitor and the second capacitor that are not influenced by the state of the load.

According to the embodiment, since it is possible to use each detection value of the first detection unit and the second detection unit at the time of charging and discharging in which current flows in the direction from the first capacitor to the second capacitor, and each detection value of the first detection unit and the second detection unit at the time of charging and discharging in which current flows in the direction from the second capacitor to the first capacitor, by averaging offset error and gain error included in the plurality of the detection values by correcting the first detection unit and the second detection unit, it is possible to sufficiently reduce the expected value of the errors in the both of the first detection unit and the second detection unit.

According to the embodiment, if the charge-discharge circuit includes an inductor, each detection value of the first detection unit and the second detection unit is a value after being affected by the induction components of the inductor after elapse of a predetermined time from the start of charge and discharge, it is possible to improve the accuracy of necessity determination of the correction for errors in both of the first detection unit and the second detection unit.

According to the embodiment, the detection values of the first detection unit and the second detection unit detected at an appropriate timing based on the inductance of the inductor can be utilized in the necessity determination of the correction to the errors included in both of the first detection unit and the second detection unit.

According to the embodiment, even when the charge-discharge circuit includes a convertor, by correcting at least one of the detection value of the first detection unit and the detection value of the second detection unit, based on the coefficient of the convertor, it is possible to accurately perform the necessity determination of the correction to the errors included in both of the first detection unit and the second detection unit.

According to the embodiment, the detection values of the first detection unit and the second detection unit corrected by a coefficient based on the voltage conversion rate of the convertor can be utilized in the necessity determination of correction for the errors included in both of the first detection unit and the second detection unit.

According to the embodiment, if it is determined that there is a need to reduce the error by correction in the necessity determination of the correction, by utilizing the detection values of the first detection unit and the second detection unit, the expected value of errors included in both of the first detection unit and the second detection unit can be reduced by correction.

According to the embodiment, in the power storage apparatus that uses two capacitors having different characteristics in combination, it is possible to reduce the expected value of the errors included in all the plurality of detection units that detects the input and output current of the capacitors.

Obviously, numerous modifications and variations of the present invention are possible in light of the above teachings. It is therefore to be understood that within the scope of the appended claims, the invention may be practiced otherwise than as specifically described herein.

What is claimed is:

1. A power storage apparatus comprising:
   a first storage module comprising:
      a first capacitor; and
      a first detector to detect first current input to and output from the first capacitor;
   a second storage module comprising:
      a second capacitor; and
      a second detector to detect second current input to and output from the second capacitor;
   a charge-discharge circuit connected to the first capacitor and the second capacitor to charge and discharge the first capacitor and the second capacitor; and
   circuitry configured to
      control the charge-discharge circuit to control charging and discharging between the first capacitor and the second capacitor; and
      determine whether or not at least one of the first detector or the second detector is to be corrected based on the first current and the second current during charging and discharging between the first capacitor and the second capacitor,
   wherein the circuitry calculates an average value of the first current and the second current, and
   wherein the circuitry determines that the at least one of the first detector or the second detector is to be corrected if a difference between at least one of the first current or the second current and the average value is larger than a threshold current.

2. The power storage apparatus according to claim 1, wherein the charging and discharging between the first capacitor and the second capacitor comprise charging and discharging in which current flows from the first capacitor to the second capacitor, and charging and discharging in which current flows from the second capacitor to the first capacitor.

3. The power storage apparatus according to claim 1, wherein the charge-discharge circuit comprises an inductor, and the circuitry determines whether or not the circuitry corrects the first detector and the second detector based on the first current and the second current after elapse of a predetermined time from start of charging and discharging between the first capacitor and the second capacitor.

4. The power storage apparatus according to claim 1, wherein the charge-discharge circuit comprises a converter that converts at least one of an output voltage of the first capacitor or an output voltage of the second capacitor, and the circuitry corrects at least one of the first current or the second current based on a predetermined coefficient in the converter.

5. The power storage apparatus according to claim 1, wherein the circuitry corrects at least one of the first detector or the second detector when the circuitry determines that the circuitry corrects the first detector and the second detector.

6. The power storage apparatus according to claim 1, wherein the circuitry corrects both of the first detector and the second detector when the circuitry determines that the circuitry corrects the first detector and the second detector.

7. The power storage apparatus according to claim 1, wherein the second capacitor is superior to the first capacitor in an output weight density, and is inferior in an energy weight density.

8. A transport device comprising the power storage apparatus according to claim 1.

9. A power storage apparatus comprising:
a first storage module comprising:
 a first capacitor; and
 a first detector to detect first current input to and output from the first capacitor;
a second storage module comprising:
 a second capacitor; and
 a second detector to detect second current input to and output from the second capacitor;
a charge-discharge circuit connected to the first capacitor and the second capacitor to charge and discharge the first capacitor and the second capacitor; and
circuitry configured to
 control the charge-discharge circuit to control charging and discharging between the first capacitor and the second capacitor; and
 determine whether or not at least one of the first detector or the second detector is to be corrected based on the first current and the second current during charging and discharging between the first capacitor and the second capacitor,
wherein the charge-discharge circuit comprises an inductor,
wherein the circuitry determines whether or not the circuitry corrects the first detector and the second detector based on the first current and the second current after elapse of a predetermined time from start of charging and discharging between the first capacitor and the second capacitor, and wherein the predetermined time is based on the inductance of the inductor.

10. A power storage apparatus comprising:
a first storage module comprising:
 a first capacitor; and
 a first detector to detect first current input to and output from the first capacitor;
a second storage module comprising:
 a second capacitor; and
 a second detector to detect second current input to and output from the second capacitor;
a charge-discharge circuit connected to the first capacitor and the second capacitor to charge and discharge the first capacitor and the second capacitor; and
circuitry configured to
 control the charge-discharge circuit to control charging and discharging between the first capacitor and the second capacitor; and
 determine whether or not at least one of the first detector or the second detector is to be corrected based on the first current and the second current during charging and discharging between the first capacitor and the second capacitor,
wherein the charge-discharge circuit comprises a converter that converts at least one of an output voltage of the first capacitor or an output voltage of the second capacitor,
wherein the circuitry corrects at least one of the first current or the second current based on a predetermined coefficient in the converter, and
wherein the predetermined coefficient is a voltage conversion ratio of the converter.

11. A control method comprising:
controlling charging and discharging between a first capacitor and a second capacitor;
determining whether or not at least one of a first detector or a second detector is to be corrected based on a first current and a second current during charging and discharging between the first capacitor and the second capacitor, the first detector being to detect the first current input to and output from the first capacitor, the second detector being to detect the second current input to and output from the second capacitor; and
calculating an average value of the first current and the second current,
wherein it is determined that the at least one of the first detector or the second detector is to be corrected if a difference between at least one of the first current or the second current and the average value is larger than a threshold current.

* * * * *